United States Patent
Kasper

(10) Patent No.: US 10,055,157 B2
(45) Date of Patent: Aug. 21, 2018

(54) WORKING METHOD FOR A MASS STORAGE SYSTEM, MASS STORAGE SYSTEM AND COMPUTER PROGRAM PRODUCT

(71) Applicant: FUJITSU LIMITED, Nakahara-Ku (JP)

(72) Inventor: Dieter Kasper, Biessenhofen (DE)

(73) Assignee: FUJITSU LIMITED, Kawasaki (JP)

( * ) Notice: Subject to any disclaimer, the term of this patent is extended or adjusted under 35 U.S.C. 154(b) by 690 days.

(21) Appl. No.: 14/424,227

(22) PCT Filed: Aug. 5, 2013

(86) PCT No.: PCT/EP2013/066399
§ 371 (c)(1),
(2) Date: Feb. 26, 2015

(87) PCT Pub. No.: WO2014/032910
PCT Pub. Date: Mar. 6, 2014

(65) Prior Publication Data
US 2015/0212754 A1 Jul. 30, 2015

(30) Foreign Application Priority Data

Aug. 31, 2012 (DE) ........................ 10 2012 108 103

(51) Int. Cl.
*G06F 3/06* (2006.01)
(52) U.S. Cl.
CPC .......... *G06F 3/0625* (2013.01); *G06F 3/0605* (2013.01); *G06F 3/0619* (2013.01);
(Continued)

(58) Field of Classification Search
CPC .... G06F 3/0689; G06F 3/0665; G06F 3/0619; G06F 3/0685; G06F 3/0605; G06F 3/0625; G06F 3/0649
(Continued)

(56) References Cited

U.S. PATENT DOCUMENTS 6,490,666 B1    12/2002  Cabrera et al.
8,006,111 B1 *   8/2011  Faibish ................. G06F 1/3221
                                                        711/114
(Continued)

FOREIGN PATENT DOCUMENTS

EP        1 462 927      9/2004
WO       2004/021123     3/2004

OTHER PUBLICATIONS

"RAID," Aug. 22, 2012, http://de.wikipedia.org/w/index.php?title=RAID&oldid=107119246.
(Continued)

*Primary Examiner* — Jasmine Song
(74) *Attorney, Agent, or Firm* — Fujitsu Patent Center

(57) ABSTRACT

A working method for a mass storage system includes providing a virtual file system for at least one user of the mass storage system; determining an access probability for files stored logically in the virtual file system, storing distributed files whose access probability lies above a predetermined limit value in a plurality of first physical mass storage devices which are independent of one another and have read/write units independent of one another and storing combined files whose access probability lies below the predetermined limit value in at least one contiguous storage region of at least one second physical mass storage device.

20 Claims, 6 Drawing Sheets

(52) U.S. Cl.
CPC .......... *G06F 3/0649* (2013.01); *G06F 3/0665* (2013.01); *G06F 3/0685* (2013.01); *G06F 3/0689* (2013.01); *Y02D 10/154* (2018.01)

(58) Field of Classification Search
USPC ........................................................ 711/114
See application file for complete search history.

(56) References Cited

U.S. PATENT DOCUMENTS

| | | |
|---|---|---|
| 2003/0046270 A1 | 3/2003 | Leung et al. |
| 2004/0111558 A1 | 6/2004 | Kistler et al. |
| 2009/0254702 A1 | 10/2009 | Kumano et al. |
| 2011/0320709 A1* | 12/2011 | Han .................. G06F 3/061 711/114 |

OTHER PUBLICATIONS

Patterson, D.A., et al., "A Case for Redundant Arrays of Inexpensive Disks (RAID)," International Conference on Management of Data, 1988, Chicago, pp. 109-116.

* cited by examiner

WORKING METHOD FOR A MASS STORAGE SYSTEM, MASS STORAGE SYSTEM AND COMPUTER PROGRAM PRODUCT

TECHNICAL FIELD

This disclosure relates to a working method for a mass storage system, particularly a RAID system, which provides at least one virtual file system for at least one user of the mass storage system. The disclosure further relates to a mass storage system suitable for carrying out the method, as well as to a computer program product with program instructions that runs on a data processing unit of an electronic data processing system.

BACKGROUND

Mass storage systems, particularly RAID systems, and working methods suitable for operation thereof, are known. In particular, "A Case for Redundant Arrays of Inexpensive Disks (RAID)" by David A. Patterson, Garth Gibson and Randy H. Cats, published in the International Conference on Management of Data, 1988, Chicago, discloses the concept, since known generally as the RAID system, of distributed storage of data over several hard disks that are physically independent of each other. A user of the mass storage system no longer notices the physical separation of the individual mass storage devices, but stores data in a logical or virtual file system, the associated data of which is archived physically on one or a plurality of mass storage devices.

The use of RAID systems offers a number of advantages in general. In particular, extensive data can be distributed over several physical hard disk drives. This has the advantage inter alia that read/write accesses can be accelerated, since the data transfer rates of several physical mass storage devices are available. Furthermore, a redundancy of the data and hence a safeguard against the failure of an individual hard disk drive can be achieved by archiving data simultaneously on several physical mass storage devices. The advantages can also at least partially be combined with one another in different operating modes, which are known generally as RAID levels.

One disadvantage that accompanies the above-mentioned RAID approach is that the provision of a multiplicity of mass storage devices operated independently of one another necessitates an increased energy requirement. Even the provision of just a few hard disk drives, for example, four hard disk drives each having a capacity of 250 GB, compared to the provision of a single hard disk drive having, for example, a capacity of 1 TB, requires a not inconsiderable increased demand for electrical energy owing to the control electronics that are additionally required and the drive for the disk pack that is present in each case. This additional energy requirement increases further if, as described above, redundant data retention is desired. Hence further, additional hard disk drives are used. In particular in the commercial environment, in which nowadays very large amounts of data are held in centralized data centers, the problem is exacerbated. If several hundred or, if necessary, even several thousand hard disk drives are being used, in addition to the power required to operate them, further expense is incurred to cool them during operation.

Measures to reduce energy consumption of individual disk drives are known. For example, it is known to use an operating system or an internal hard disk controller to deactivate the drive for a pack of rotating storage media temporarily, if a drive is not currently being accessed. However, the disconnection known per se contains a series of disadvantages. First, upon renewed access to a mass storage device that has been deactivated in this manner, the disk pack must first be re-accelerated before the desired access can be carried out, which leads to longer access times. Second, the repeated switching off and re-acceleration of the disk pack results in increased mechanical wear and, hence, a shorter service life of the mass storage device. Therefore, at least in data centers in which a multiplicity of files are held for a multiplicity of users in extensive mass storage systems, such energy-saving options are not normally, or only seldom, used.

Another problem is describing a working method for a mass storage system and a mass storage system, which for substantially the same performance has a reduced energy consumption compared to known mass storage systems, or which for the same energy requirement is able to provide a better performance. From the point of view of its users, the mass storage system should preferably behave like a conventional mass storage system.

SUMMARY

I provide a working method for a mass storage system including: providing a virtual file system for at least one user of the mass storage system; determining an access probability for files stored logically in the virtual file system, storing distributed files whose access probability lies above a predetermined limit value in a plurality of first physical mass storage devices which are independent of one another and have read/write units independent of one another, and storing combined files whose access probability lies below the predetermined limit value in at least one contiguous storage region of at least one second physical mass storage device.

I also provide a mass storage system including: a plurality of first physical mass storage devices that are independent of each other with read/write units that are independent of each other; at least one second physical mass storage device; at least one interface device that provides a virtual file system for at least one user of the mass storage system; and at least one control device that selectively stores files stored logically in the virtual file system on the first physical mass storage devices or on the at least one second physical mass storage device, wherein the control device determines an access probability for the files stored logically in the virtual file system, to store files whose access probability lies above a first predetermined limit value distributed in a plurality of first physical mass storage devices independent of one another with read/write units that are independent of one another, and to store files whose access probability lies below the predetermined limit value jointly in at least one contiguous storage region of the at least one second physical mass storage device.

I further provide a computer program product including program instructions stored in a non-volatile memory device, wherein during execution of the program instructions on at least one data processing unit of an electronic data processing system the following steps are carried out: determining an access probability for files stored logically in a virtual file system of at least one user; distributed storage of files whose access probability lies above a predetermined limit value in a plurality of first physical mass storage devices of the electronic data processing system which are independent of one another and have read/write units independent of one another; and combined storage of files whose access probability lies below the predetermined limit value in at least one contiguous storage region of at least one second physical mass storage device of the electronic data processing system.

LIST OF REFERENCE SIGNS

Figure 1:
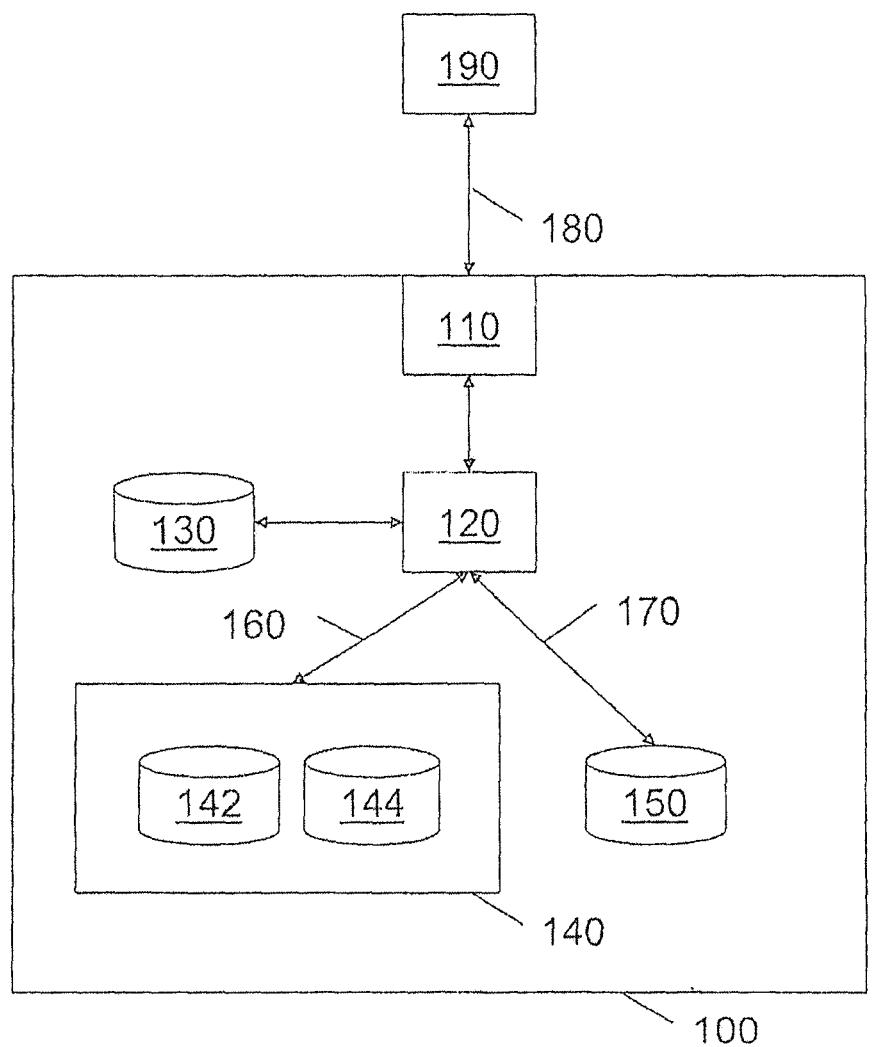
FIG. 1 shows a schematic representation of a mass storage system according to one example.

100 Mass storage system
110 Network interface
120 Control device
130 Database
140 Primary storage network
142 Physical mass storage device
144 Physical mass storage device
150 Physical mass storage device
160 Primary connecting structure
170 Secondary connecting structure
180 Network
190 Client computer
200 Method
210-290 Method steps
300 Method
310-360 Method steps
400 Method
410 Method step
420 Group
430 Method step
440 Group
450 Method step
460 Group
470 Group
500 RAID system
510 NAS head
515 IP-network
520 Client
530 Interconnect structure
540 Primary storage network
542 Primary mass storage device
544 Primary mass storage device
546 Primary mass storage device
550 External mass storage device
560 IP-interconnect layer
570 Central processing unit
600 Mass storage system
610 Virtual file system
620 First file
622 Data content
624 Read date
626 Write date
628 File segment
630 Second file
632 File content
634 Read date
636 Write date
638 File segment
640 Primary storage network
642 Physical mass storage device
644 Physical mass storage device
646 Physical mass storage device
650 Cluster file system
660 Mass storage device
662 File system
670 Mass storage device
672 File system I provide a working method for a mass storage system, particularly a RAID system. It comprises the steps of:
providing a virtual file system for at least one user of the mass storage system,
determining an access probability for files stored logically in the virtual file system,
distributed storage of files whose access probability lies above a predetermined limit value in a plurality of first physical mass storage devices which are independent of one another and have read/write units which are independent of one another and
combined storage of files whose access probability lies below the predetermined limit value in at least one contiguous storage region of at least one second physical mass storage device.

The working method subdivides files archived in a virtual file system of a mass storage system on the basis of an access probability into at least two groups having different access probabilities. In this connection, files accessed with a comparatively high probability are archived distributed in a plurality of first physical mass storage devices which are independent of one another to combine the read/write performance of the mass storage devices involved to the advantage of the user, as in conventional RAID systems. In contrast, files whose access probability lies below a predetermined limit value are archived contiguously in a storage region of at least one second physical mass storage device. Therefore, at least to store the last-mentioned group of files it is normally only necessary to operate a single physical mass storage device, and therefore the energy consumption of the mass storage system is reduced overall compared with a conventional RAID system with a distributed storage of all data.

Preferably, when the at least one second physical mass storage device has not been accessed for a predetermined period of time the at least one second physical mass storage device is switched into an operating state which has a reduced energy consumption compared to a normal operating state. The at least one second physical mass storage device is switched back into the normal operating state when an access request for at least one file stored on the at least one second physical mass storage device is registered via the virtual file system. Provision of the above-mentioned steps leads to further energy saving owing to the fact that the second physical mass storage device is switched off at least temporarily. The drawbacks of a delayed access time and increased wear that this basically involves are of less consequence in the working method than in known mass storage systems since the probability of access to the second physical mass storage device on the basis of the distribution of files is especially low, so that the second physical mass storage device also has to be switched into the normal operating state only very rarely.

Advantageously, the files of the virtual file system may be divided into groups having different access probability regions. In this connection, in a further example, files of a first group having a comparatively high access probability are divided into segments of predetermined size, wherein the segments of a file having more than one segment are stored distributed over the plurality of mass storage devices that are independent of one another. If in this manner the content of large files which are frequently accessed is distributed over several physical mass storage devices, the result is an increased performance of the mass storage system overall compared to archiving a corresponding file on a single physical mass storage device.

The access probability for a file can be determined, for example, based on at least a time of creation of the file, a time of the last write access to the file, a time of the last read access to the file and/or a number of read and/or write accesses to the file within a predetermined period of time.

I also provide a mass storage system, particularly a RAID system. The system comprises a plurality of first physical mass storage devices independent of each other and have read/write units independent of each other, at least one second physical mass storage device and at least one interface device that provide a virtual file system for at least one user of the mass storage system. The system further comprises at least one control device for selective storing of the files stored logically in the virtual file system on the first physical mass storage devices or on the at least one second physical mass storage device. The control device determines an access probability for the files stored logically in the virtual file system, to store files whose access probability lies above a first predetermined limit value distributed in a plurality of first physical mass storage devices that are independent of one another and have read/write units independent of one another, and to store files whose access probability lies below the predetermined limit value together in at least one contiguous storage of the at least one second physical mass storage device.

Such a mass storage system has essentially the same advantages as the above-mentioned working method.

The at least one second physical mass storage device preferably comprises a drive unit and at least one storage medium which can be driven in rotation by the drive unit, wherein the control unit or the at least one second physical mass storage device switches off the drive unit when the at least one second physical mass storage device has not been accessed for a predetermined period of time. By switching off the spindles with rotating storage media contained in conventional hard disks, the energy required for operation thereof in a standby mode can be considerably reduced.

The files stored in the mass storage system may be redundantly stored to provide a safeguard against failure of an individual mass storage device. For redundant storage of the files with low access probability the mass storage system comprises at least two second physical mass storage devices, wherein files stored on a first of the at least two second physical mass storage devices is redundantly stored on at least a second of the at least two second physical mass storage devices. This corresponds substantially to the known RAID 1 operating mode and has the additional advantage that when reading data only one of the at least two second mass storage devices has to be brought into a normal operating state. For redundant storage of the files with high access probability, files or segments of files stored on a first of the plurality of first physical mass storage devices are redundantly stored on at least a second of the plurality of first physical mass storage devices. This corresponds substantially to the known RAID 1, 3, 4, 5 or 6 operating modes or RAID combinations thereof, such as, for example, a RAID 15 array, and combines the advantages of high access bandwidth with those of high data security.

In the case of the mass storage system the plurality of first physical mass storage devices may be connected via a first local connecting structure having a first bandwidth to the at least one interface device and the at least one second physical mass storage device may be connected via a second connecting structure having a second bandwidth that is smaller than the first bandwidth to the at least one interface device. By using different connecting structures for the first physical mass storage devices on the one hand and the at least one second physical mass storage device on the other hand, at the level of the connecting structures a performance-related decoupling between files having a high access probability and files have a low access probability can be effected. For example, the files of the first group can be read and written preferably according to the Fiber Channel Protocol or a Remote Direct Memory Access (RDMA) Protocol, in particular a RDMA over InfiniBand Protocol such as, for example, the SCSI RDMA Protocol (SRP), the Sockets Direct Protocol (SDP) or the native RDMA Protocol or an RDMA over Ethernet Protocol such as, for example, the RDMA over Converged Ethernet (RoCE) or the Internet Wide Area RDMA (iWARP) Protocol, for access to local mass storage devices with an especially high data transfer rate, whereas files of the second group can be read or written with a different, less efficient protocol, for example, a TCP/IP-based protocol for access to remote storage media.

Preferably, the plurality of first physical mass storage devices is managed by the control device via a common, distributed first file system, and the at least one second physical mass storage device is managed via a second file system specific to the mass storage device. Provision of different file systems allows a simple implementation and performance-related management of the different mass storage devices.

Individual subgroups of files of the virtual file system may be assigned to different physical mass storage devices, wherein the access speed of the mass storage devices used in each case is adapted to the access probability of the corresponding group. For example, it is possible to store files which are accessed especially frequently on especially efficient semiconductor mass storage devices, in particular what are known as SSD (solid state drives), whereas files with a medium access probability are stored on mass storage devices with rotating storage media such as in particular SCSI and SATA hard disk drives. Files having especially low access probability can be stored on physically externally arranged mass storage media, in particular what are known as Network-Attached Storage (NAS) or Direct-Attached Storage (DAS) storage drives.

I further provide a computer program product with program instructions for running on a data processing unit of an electronic data processing system. The computer program product has substantially the same advantages as the working method and the mass storage system.

My systems, products and methods are described in detail hereinafter by examples and with reference to the appended figures.

FIG. 1 shows a mass storage system 100 according to a first example. The mass storage system 100 comprises a network interface 110, a control device 120 and an internal memory to archive control data, in particular metadata, about data in the form of a database 130 stored in the mass storage system 100. Furthermore, the mass storage system 100 comprises two first physical mass storage devices 142 and 144 and one second physical mass storage device 150.

The first physical mass storage devices 142 and 144 together form a primary storage network 140 and connect via a local primary connecting structure 160, in particular an especially efficient Fibre Channel or RDMA connection, to the control device 120. The second physical mass storage device 150 connects via a secondary connecting structure 170, in particular a comparatively inexpensive Internet Protocol connection, e.g. a TCP/IP connection over 1 Gbit/s Ethernet, to the control device 120. Furthermore, the control device 120 functionally connects to the network interface 110, which connects the mass storage system 100 via a network 180 to a client computer 190.

In operation, by a suitable network protocol the client computer 190 accesses the data of the mass storage system 100 via the network 180 and the network interface 110. For that purpose, read and write requests of the client computer 190 are analysed by the control device 120 and relayed to the mass storage devices 142, 144 and/or 150 according to the data requested. Apart from any file information about the particular file systems of the mass storage devices 142, 144, 150 used, the metadata contained in the database 130 is used additionally or alternatively to determine what data is arranged on which one of the mass storage devices 142, 144, 150. The database 130 itself can be stored on the mass storage devices 142 and/or 144 of the primary storage network 140 or on another internal mass storage device or the main memory of the mass storage system 100.

To simplify matters, the following description refers always to "files" stored on the mass storage devices 142, 144 and 150. These files can be, for example, files arranged in a hierarchical file system and are identifiable via a full path and file name. However, the system described hereafter is also suitable for other mass storage systems that instead of files use different kinds of objects, and instead of paths and file names use other identifiers. The term "file" shall therefore be understood to mean any content-related data unit that can be retrieved from a mass storage system by a suitable identifier. Examples of such data units are also objects of an object-based storage system or predefined regions of a mass storage system. The term "file system" shall be understood correspondingly to mean any suitable access structure for such data units, i.e. also tables or other mechanisms that assign an identifier to a data unit.

In the example described, all write requests received from the client computer 190 are distributed via the Fiber Channel or RDMA connection 150 to the physical mass storage devices 142 and 144. In this connection the distribution can be effected, for example, such that write requests are alternately relayed to the physical mass storage device 142 and the physical mass storage device 144 so that a first write request for the physical mass storage device 142 does not block a subsequent write request for the further physical mass storage device 144.

Alternatively, it is also possible to share the processing of a single request over the two physical mass storage devices 142 and 144 of the primary storage network. This is particularly advantageous when storing especially extensive files. In this so-called "data slicing", equal size blocks of data of an extensive file are normally distributed over physical storage sectors of several mass storage devices, in this case the physical mass storage devices 142 and 144 so that the data throughput is also increased during processing of an individual write request.

The same data or the data and accompanying redundancy information such as parity values for instance, can also be stored on several physical mass storage devices 142 and 144 or redundantly at different locations of the physical mass storage devices 142 or 144 of the primary storage network 140 to protect the stored data against failure of an entire mass storage device 142 or 144 or individual sectors of the mass storage device 142 or 144. Methods of this kind for redundant data storage are known and therefore not described in detail here.

Read requests to the mass storage system 100 are carried out in the example according to the storage location of the file requested. For that purpose, the control device 120 first of all accesses the database 130 which, in the example, for each stored file contains resource information about whether it is stored in the primary storage network 140 or on the second physical mass storage device 150. The database 130 determines a logical or physical storage address of the requested data in the primary storage network 140 or in the second physical mass storage device 150 and returns this to the control device 120.

Distribution of the files over the mass storage devices 142, 144 and 150 is described in detail below by FIGS. 3 and 4. To understand the mass storage system 100 illustrated here, it is sufficient to know that files which are especially frequently accessed are stored on the physical mass storage devices 142, 144 and other files which are accessed less frequently are stored on the second physical mass storage device 150. Depending on the storage location determined, the control device 120 retrieves the corresponding stored data from the first physical mass storage device 142 and 144 or the second physical mass storage device 150. When retrieving data from the first physical mass storage devices 142, 144, it is possible to use what is known as "data slicing", as described above with reference to the writing operation so that, for example, data blocks are read alternately from the first physical mass storage device 142 and the first physical mass storage device 144 to increase the bandwidth available for reading above the bandwidth of an individual mass storage device 142 or 144. Files archived on the second physical mass storage device 150 are in contrast contiguously stored and are read in by the control device 120, independently of their volume, as a complete file and relayed via the network interface 110 to the client computer 190 submitting a request.

Figure 2:
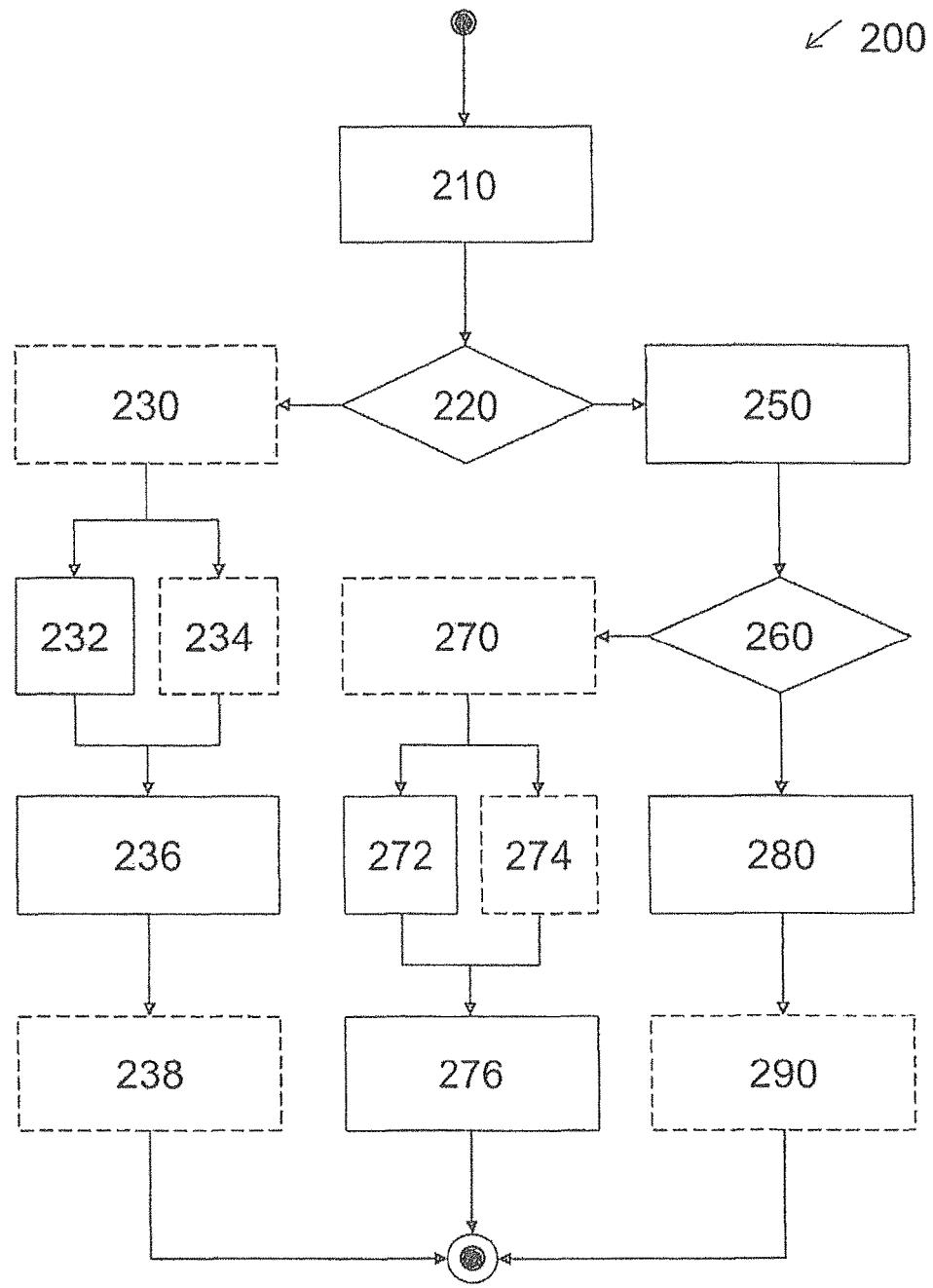
FIG. 2 shows a flowchart of a first working method to operate a mass storage system.

The processing of read and write requests of the client computer 190 by a working method 200 for the mass storage system 100 is illustrated schematically in the flowchart according to FIG. 2.

In a first step 210 a request in respect of a file is received by the control device 120. For example, the request can be a request according to a network storage protocol such as, for example, the Server Message Block Protocol, the Network File System (NFS) Protocol, Amazon S3 (Simple Storage Service) Protocol or a local file access protocol, which is received via the network interface 110 from the logical or physical client computer 190.

In a subsequent step 220 the control device 120 first of all checks whether the request is a write request or a read request, which is normally clear from the protocol used to communicate with the client computer 190.

Currently written data statistically has an especially high access probability for a subsequent read or (over)write operation so that in the example data of a write access is stored in the primary storage network 140 without being further checked. For this purpose, in an optional step 230 the data transferred from the client computer 190 is first divided into file segments of equal size, which in subsequent steps 232 and 234 are written to the mass storage device 142 and mass storage device 144.

Subsequently, in a step 236, metadata of the write operations carried out are stored in the database 130 to permit subsequent read requests to the stored data. For example, a physical block address of the stored file segments on the physical mass storage devices 142 and 144 or a logic address of the file in a cluster file system of the primary storage network 140 can be registered collectively in the database 130. Additionally, statistical data such as the time of the write operation for instance, is registered in the database 130.

Processing of the write request terminates with an optional replication of the data in step 238 onto the same or further mass storage devices of the primary storage network 140.

However, if in step 220 it was established that the request is a read request, in a subsequent step 250 metadata is requested from the database 130 to determine a position of the stored data within the mass storage system 100.

To determine the position, in a decision 260 a check is first of all made using the data of the database 130 as to whether the requested file is stored on the primary storage network 140 or the mass storage device 150. This can be effected either directly using address data archived in the database 130 or indirectly by determining an access probability on the basis of stored metadata.

If the file is one with a high access probability, a read request is relayed to the physical mass storage devices 142 and 144. At the same time, in the optional step 270, the requests are optionally divided into partial requests in respect of individual file segments stored distributed over the physical mass storage devices 142 and 144. In subsequent steps 272 and 274 these file segments are read in from the physical mass storage devices 142 and 144 respectively. The read request terminates with the transfer of an optionally combined response in step 276.

If, on the other hand, it was established in step 260 that the request is directed to a file with a low access probability which is archived on the second physical mass storage device 150, in a step 280 the file is requested from the second physical mass storage device 150. If the mass storage device is in an energy-saving mode at this time, the mass storage device is first put into a normal operating state, for example, by starting up a drive for a storage disk pack. The requested file can then normally be read out of a contiguous memory region of the mass storage device 150 and transferred back to the client computer 190.

In a subsequent optional step 290, the data stored in the mass storage system 100 is optionally reorganized. The reason for this is that because of the access to the file previously ranked as a file with low access probability, the probability of a further access is statistically increased so that at least as far the accessed file is concerned, a reorganization of the mass storage system 100 could, if applicable, be necessary.

Figure 3:
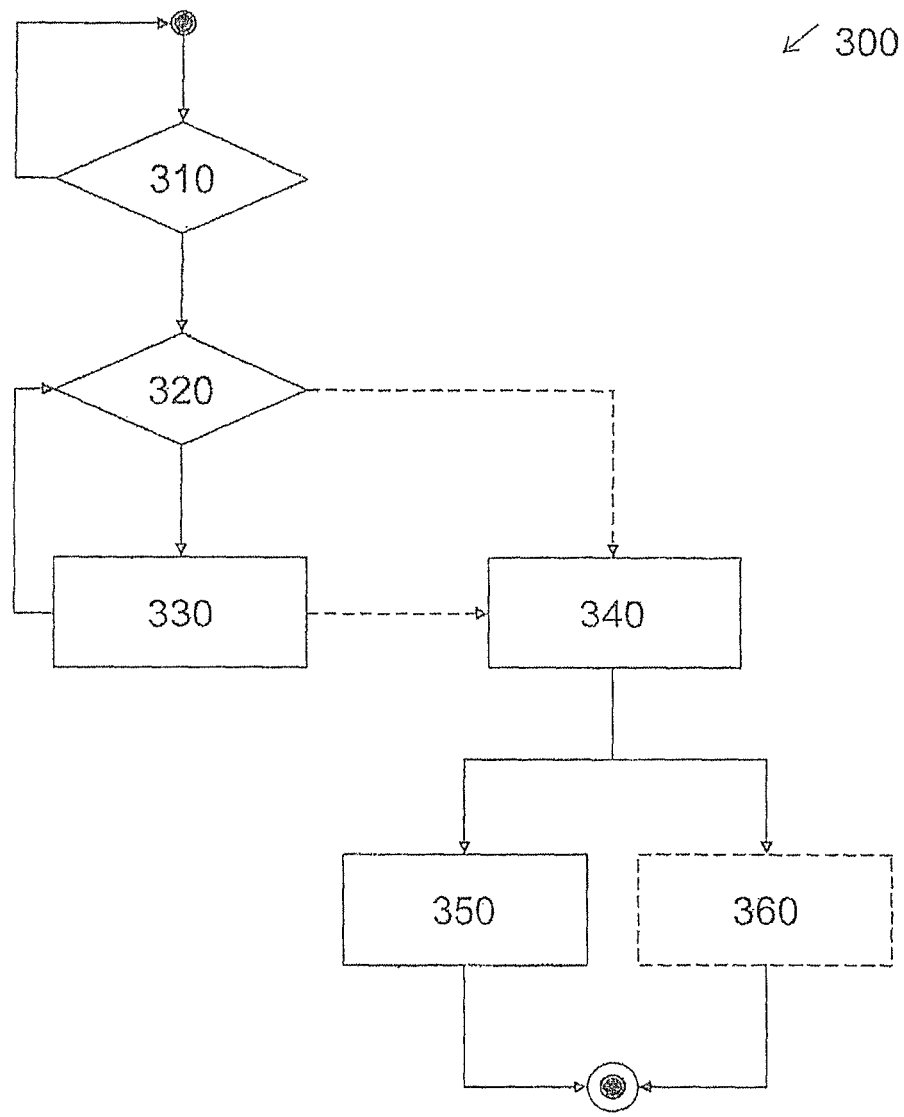
FIG. 3 shows a flowchart of a second working method of operating a mass storage system.

FIG. 3 illustrates schematically a possible method 300 of reorganizing the data of the mass storage system 100.

In a step 310 a check is first of all carried out as to whether there is a reason to reorganize the files stored in the mass storage system 100. For example, in step 310, based on a timer, a reorganization can be regularly initiated after expiration of a predetermined period of time. For example, a reorganization can be carried out at a fixed time of day, for example, at night, when particularly low access to the data stored in the system 100 is expected. Alternatively, it is possible to initiate the reorganization on the occurrence of a predetermined event, for example, when reading a file from the second physical mass storage device 150 or when a predetermined storage capacity limit of one of the mass storage devices 144, 142 or 150 is reached. Likewise, a reorganization can be initiated after a specific number of accesses to the mass storage system 100 as a whole or to the second physical mass storage device 150, or can be requested manually by an administrator of the system 100. Step 310 is repeated cyclically until a corresponding reason is given.

When a reorganization of the mass storage system 100 is desired or needed, in a subsequent step 320 a check is first made as to whether further data is available for the reorganisation. The method 300 of reorganization can relate in principle to all files stored in the mass storage system 100, files of individual mass storage devices 142, 144 and/or 150 or even just selected or individual files. For example, it is possible to monitor the access probability for a single file as circumstances require, that is, in the event of an access in step 290 described with reference to FIG. 2.

If a file is due for reorganization, in a subsequent step 330 the access probability for the file stored in the mass storage system 100 is determined. The access probability is also referred to in the further description for illustrative purposes as the "temperature" T of the file to be analysed. In this connection a "high file temperature" stands illustratively for a high access probability, that is, for files which are especially frequently accessed. Conversely, a "low file temperature" stands for those files that are only rarely or no longer retrieved at all from the mass storage system 100.

Different mechanisms are possible to determine the temperature T of a file. One of these is described in detail below with reference to FIG. 4. Generally, it is true that the probability of access to a file is greater if the file has already been accessed frequently in the past or the last read or write access took place only a relatively short time ago. Conversely, for files that were not requested in the past or only rarely in a more recent period, it is likely that they will not be requested in the foreseeable future either, and therefore have a low file temperature.

Once the temperature T of a file has been determined, the method in step 320 continues with establishing whether the temperature for further files needs to be determined.

In a subsequent or parallel step 340, a limit value $T_{REF}$ is determined in respect of the distinction between files with high access probability or temperature and files with a low access probability or temperature. Here, the limit value $T_{REF}$ can either be fixed, or freely selectable by a system administrator.

Alternatively, it is also possible to determine the limit value $T_{REF}$ in step 340 dynamically, in particular by utilization of the storage capacity of the mass storage devices 142, 144 and 150. For example, in step 340 the limit value $T_{REF}$ can be selected such that 20% of the stored "hot" data is archived on the first mass storage devices 142 and 144, while the remaining 80% "colder" data is archived on the second physical mass storage device 150. In addition to a fixed ratio, the ratio can of course also be selected dynamically, especially as a function of the absolute storage capacity or a remaining storage capacity of the mass storage devices 142, 144 and/or 150.

Conversely, files whose temperature determined in step 330 lies below the limit temperature determined in step 340, but which are stored in the primary storage network 140 are shifted from there in the optional step 360 onto the second physical mass storage device 150.

In a following step 350, the files whose temperature T determined in step 330 lies above the limit temperature $T_{REF}$ determined in step 340, but which are stored on the second physical mass storage device 150, are shifted in step 350 into the first physical mass storage device 142 and/or 144 of the storage network 140. As regards writing of the data, the reader is referred to the observations relating to steps 230 to 238 of FIG. 2.

Once the reorganization is complete, the method 300 ends, wherein storage regions of the mass storage devices 142, 144 and 150 no longer required are optionally released for re-use.

Figure 4:
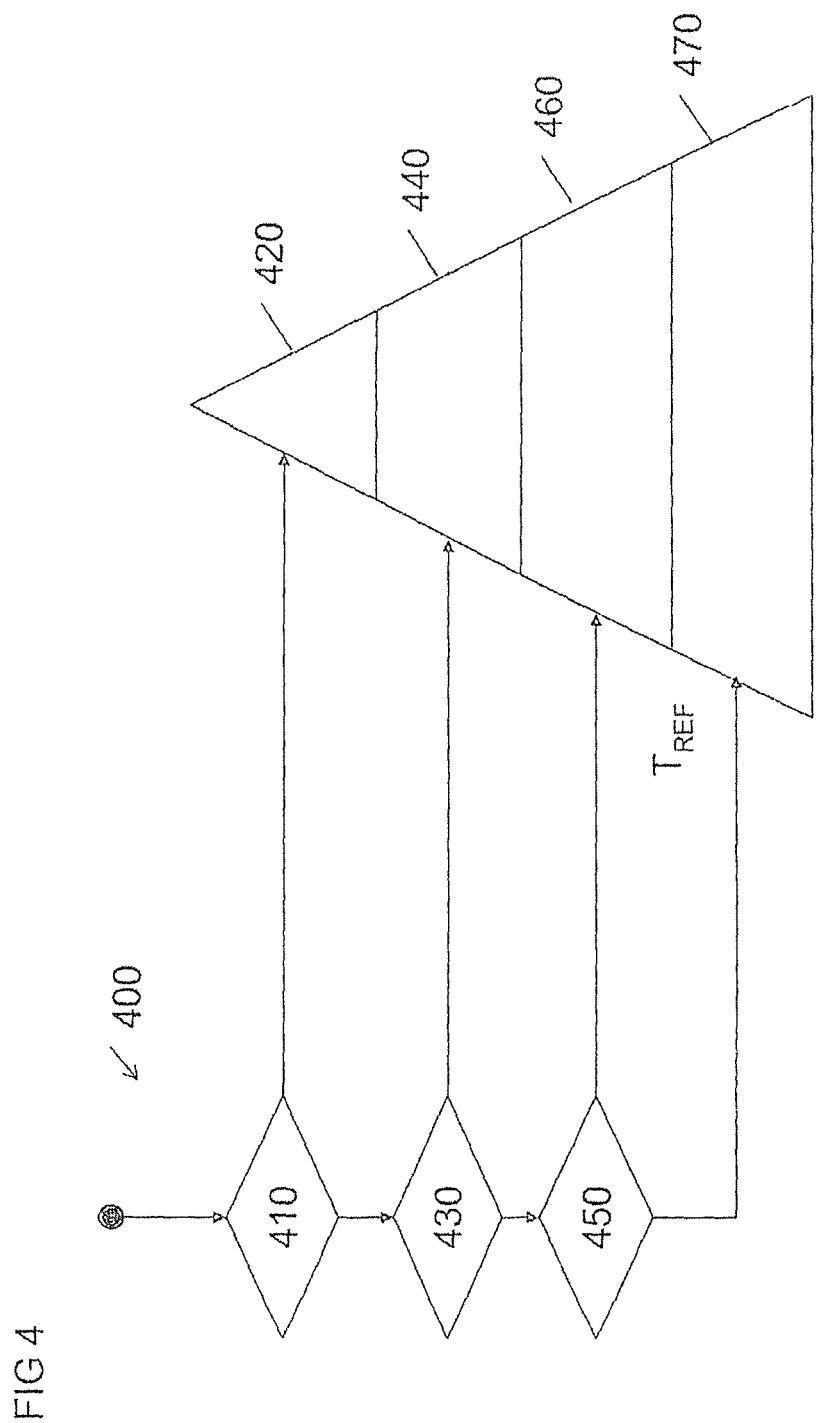
FIG. 4 shows a flowchart of a determination method for and a schematic representation of different access probabilities.

FIG. 4 shows schematically a simplified method 400 to determine a temperature of a file in four different predetermined temperature regions, each of which is assigned to a group of files having a similar access probability.

According to the method 400, in a first step 410 a check is carried out as to whether the file in question has been write-accessed within a predetermined period of time t1. If, for example, the file has only just been created or overwritten in the last minute, it is a file actively being edited, which is assigned to a first group 420 comprising "hottest" files.

If the file is not currently being written, in a subsequent step 430 a check is made as to when the last read access to the file occurred. If the last read access occurred within a period t2, for example, within the last hour, the file is assigned to a further group 440 comprising "hot files".

If this is not the case either, a further check 450 establishes how often in total the file was accessed. If the established number of accesses lies above a predetermined limit value N, for example, three read accesses since the last write access, it is assigned to a group 460 comprising "warm files". Otherwise it is assigned to a last group 470 comprising "cold files".

The division according to the method can, of course, be modified or refined in diverse ways. In particular, the metadata typically registered in a file system for a file can be combined in many different ways to determine a more or less continuous distribution of file temperatures or access probabilities.

The pyramidal representation of the groups indicates the customary distribution of access probabilities. According to empirical studies the most frequently used files constitute only a small part of the total storage capacity, and vice versa. FIG. 4 additionally also indicates the threshold value $T_{REF}$, which leads to the above-described unequal treatment of the upper and lower part of the pyramid.

Figure 5:
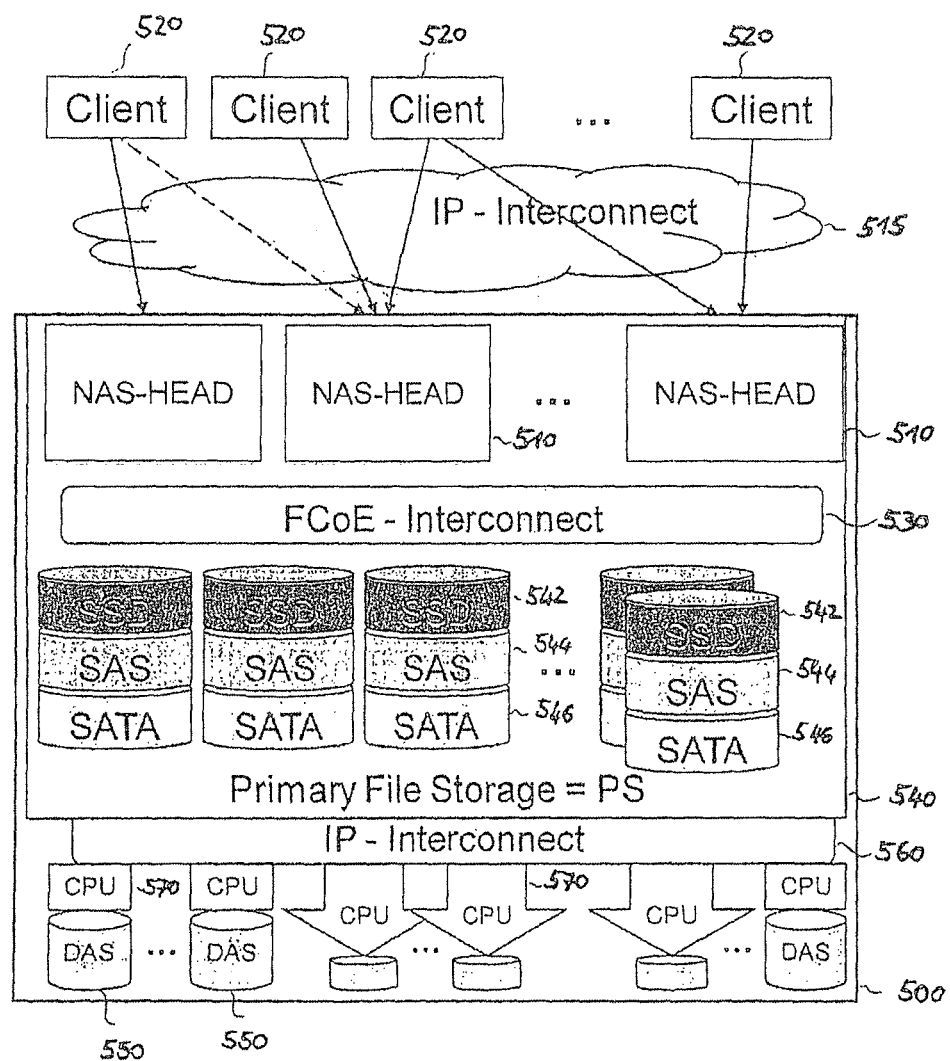
FIG. 5 shows a schematic representation of a RAID system according to one example.

FIG. 5 shows a possible implementation of a mass storage system in the form of a RAID system 500 that stores files assigned to four different groups with different access probabilities.

The RAID system 500 comprises a plurality of what are known as NAS heads 510, which offer the files stored in the RAID system 500 to a plurality of clients 520 via an IP network 515 in accordance with a generally known protocol, for example, the NFS file system known from UNIX. Internally, the NAS heads 510 in the illustrated connect via what is known as a Fiber Channel over Ethernet (FCoE) interconnect structure 530 to a multiplicity of primary mass storage devices 542, 544 and 546 of a primary storage network 540. Alternatively, the interconnect structure 530 can also be configured as an InfiniBand and/or Ethernet connection.

In the example according to FIG. 5, the primary mass storage devices 542, 544 and 546 are divided into three groups, each having a different capacity. The first group comprises physical mass storage devices 542 in the form of what are known as SSD semiconductor storage drives. The second group comprises physical mass storage devices 544 in the form of mass storage devices with rotating storage media, which are equipped with an interface according to the Serial Attached SCSI (SAS) standard. The third group comprises physical mass storage devices 546 in the form of mass storage devices with rotating storage media with comparatively simple serial ATA (SATA) interfaces. The mass storage devices 542, 544 and 546 have different access speeds, which are assigned, for example, to the groups 420, 440 and 460 of hottest, hot and warm files. In this manner a balance optimised in respect of cost and access performance can be found for every kind of file.

The RAID system 500 furthermore connects via what is known as an IP interconnect layer 560 to a plurality of external mass storage devices 550. In the example the external mass storage devices 550 are known as Direct-Attached Storage (DAS) drives, each of which has at least one central processing unit 570, which provide a NAS interface to the primary storage network 540. Optionally, the central processing units 570 are also configured to compress and/or deduplicate the data directed to the DAS drives and to store it appropriately. Although the external mass storage devices 550 are arranged spatially adjacent to the RAID system 500 in the same rack, they are operated independently thereof and addressed via the IP interconnect layer 560. Owing to the interposed IP connection, the transmission bandwidth between the NAS heads 510 and the external mass storage devices 550 is considerably smaller than the bandwidth between the NAS heads 510 and the internal mass storage devices 542, 544 or 546. Nevertheless, the data archived in the external mass storage devices 550 can be made available via the NAS heads 510 within a time barely perceptible to the user. In particular, the delivery takes place considerably more quickly than with known archive systems, in which data no longer buffered in an internal mass storage device first has to be read in via a tape drive from a magnetic tape or from some other removable storage medium.

In the example described, the individual components of the RAID system 500 are set up at the same location. However, depending on the interconnect structures 530 and/or 560 used, the components thereof may also be distributed over several locations in order to achieve a geographical redundancy and hence an improved protection against catastrophic events such as fires, earthquakes etc.

Since the external mass storage devices 550 are accessed only very rarely, these mass storage devices 550 are preferably set to an energy-saving mode when a particular mass storage device 550 has not been accessed for a predetermined period of time, for example, several minutes or hours. Since statistically most data maintained by a mass storage system 100 can be assigned to the group 470 of cold files, it is moreover recommended to retain this data, where applicable, in a deduplicated and compressed, or at least compressed, state. For that purpose, the central processing units 570, which ensure a deduplication of the data before storage thereof on the external mass storage devices 550, are provided between the IP interconnect layer 560 and the actual physical mass storage devices 550. The additional effort accompanying the deduplication need only be made once, or at least only comparatively seldom, provided that the data is not, as expected, retrieved or modified again by the RAID system 500.

The RAID system 500 according to FIG. 5 distributes the data stored therein as described previously with reference to FIGS. 1 to 4, based on a statistically expected access probability. In this case, particularly hot files are held so that they are quickly available by the use of especially efficient hardware. Cold files on the other hand can be kept in an especially energy-saving manner on simple hardware, without the described disadvantages of known archiving solutions being noticeable to the user. For the operator of the system there is the further advantage that a RAID system having from the user's point a view a very high total capacity can be constructed with moderate economic and technical effort.

Figure 6:
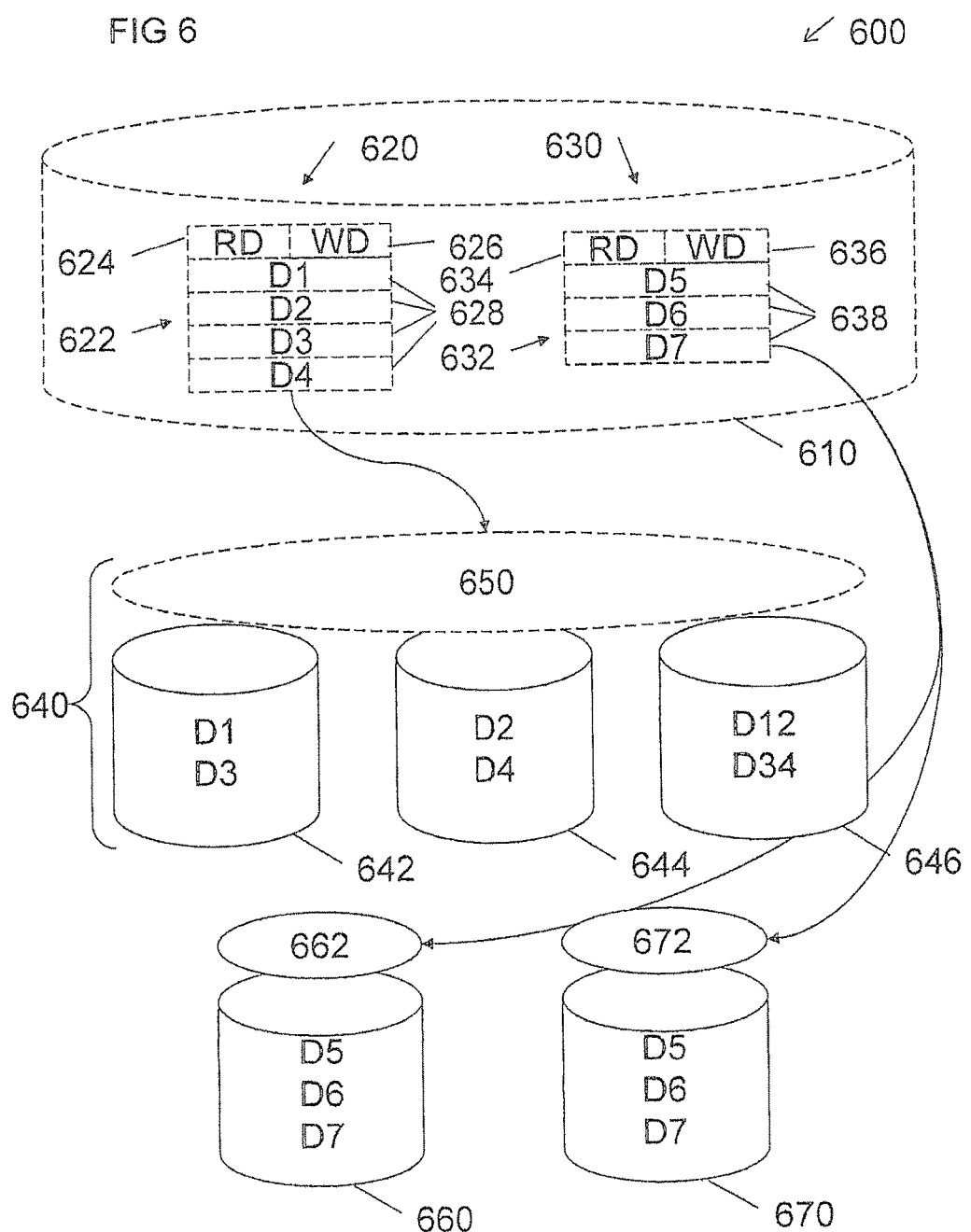
FIG. 6 shows a schematic representation of file systems of a mass storage system.

FIG. 6 shows a logical view of data archived in a mass storage system 600, for example, the mass storage system 100 or the RAID system 500. In particular, the interaction of different file systems can be seen.

Only a single file system 610 is visible externally to the user of the mass storage system 600. In technical terms the file system 610 is a virtual or logical file system, since in the mass storage system 600 there is no physical data carrier on which all files recorded in the file system 610 are archived. Access to the file system 610 is effected in a manner known per se, for example, via the NFS protocol.

FIG. 6 indicates that two files 620 and 630 are stored in the file system 610. Apart from their actual content 622 and 632 respectively, the files 620 and 630 comprise additional meta-information. For example, a time of the last access 624 and 634 respectively and a time of the last write operation 626 and 636 respectively is noted for the files 620 and 630. Moreover, further meta-information, not shown in FIG. 6, can be stored such as access rights and access frequencies and further attributes for each file. The metadata need not be fully accessible here to a user via the virtual file system 610, but may serve just for the internal organization within the mass storage system 600.

FIG. 6 also shows that the actual contents 622 and 632 of the first file 620 and the second file 630 respectively can be divided logically and physically into several file segments 628 and 638, respectively, with contents D1, D2, D3 and D4 and D5, D6 and D7, respectively. The file segments 628 and 638 may be data blocks of a fixed size, for example, a conventional block size of 512 bytes, 4 kilobytes or any other block size adapted to the structure of the mass storage device used. Of course, block sizes predefined by a system administrator or relative block sizes, for example, in each case a specific fraction of the total size of a file, can be selected.

In the state illustrated in FIG. 6, from the times 624 and 626 of the first file 620 it is clear that this file is what is known as a hot file, with a high access probability. Illustrated graphically, the temperature T1 of the first file 620 lies above a predetermined reference temperature $T_{REF}$. The file 620 is therefore mapped by the mass storage system 600 onto a distributed cluster file system 650, via which the physical mass storage devices 642, 644 and 646 of a primary storage network 640 can be addressed.

The cluster file system 650 is also a logical or virtual file system, because the data that can addressed via said system does not exist physically on a single mass storage device but is stored distributed over the two physical mass storage devices 642 and 644. For example, a first file segment 628 with content D1 of the first file 620 can be stored on the mass storage device 642 and a second file segment 628 with content D2 of the file 620 can be stored on the physical mass storage device 644. Further file segments 628 of the file 620 are distributed similarly likewise alternately over the physical mass storage devices 642 and 644 of the primary storage network 640.

In addition, FIG. 6 indicates that further associated data of the file 620, in particular the parity data D12 and D34 linked to the file segments 628 stored on the mass storage devices 642 and 644, can be archived on a further mass storage device 646 of the primary storage network 140.

Alternatively, further copies of the segments themselves can also be stored in a further mass storage device. A redundancy of the stored file 620, and, hence a safeguard against failure of one of the mass storage devices 642 or 644 can be provided by the additional data on the additional mass storage device 646. The methods used here for redundant storage of data and recovery thereof on failure of one or more mass storage devices are known and will therefore not be described in detail here.

FIG. 6 shows further that, based on the read period 634 and the write period 636 for the second file 630, it was established that this is what is known as a cold file, which in all probability is not or only very seldom retrieved from the mass storage system 600. This file 630 is stored contiguously on a secondary mass storage device 660.

"Contiguous" in this case means primarily that all file segments 638 of the second file are archived in a common partition of the second mass storage device 660 and/or can be retrieved via a common file system 662 specific to the mass storage device 660. Preferably, these file segments are stored in logically sequential blocks, wherein it is quite possible to distribute these in accordance with the control algorithm of the mass storage device 660 over spatially separate storage sectors.

Also to be able to ensure a redundancy in respect of the data stored in the mass storage device 660, and, hence a safeguard against the failure of the mass storage device 660, the data stored therein is mirrored on a second secondary mass storage device 670 with a file system 672 specific thereto. Thus, the data of the second file 630 is also stored contiguously on the second mass storage device 670, which is able to assume the function of the first secondary mass storage device 660 if this should fail.

Instead of the above-described mirroring on a second secondary mass storage device 670, mirroring can also be effected on a relatively slow tertiary storage medium known per se such as a magnetic tape, or by cloud storage. The time required to re-load the storage medium is of almost no practical significance here since the files of the secondary mass storage device 660 are in any case accessed only very rarely, and even then restoration from the tape would be required only in the unlikely event of failure of the secondary mass storage device 660 at the same time. Statistically, it is very unlikely that these uncorrelated events will occur at the same time and, therefore, there is no noticeable effect on the normal operation of the mass storage system 600.

To summarize, the mass storage systems 100 and 600 and the RAID system 500 can store extensive data centrally in an especially energy-efficient and effective manner. A grouping of files according to the same or similar access probability or file temperature serves the purpose of enabling files which are especially frequently accessed to be archived in especially fast, powerful and hence expensive data stores. Conversely, files that are never or only rarely accessed are archived in comparatively large and inexpensive, but therefore also comparatively inefficient, mass storage devices. In addition to the improvement in performance already achieved by this measure, the grouping of data also enables files having an especially low file temperature, that is, files which will probably never be accessed again, to be stored on a common physical mass storage device. For this physical mass storage device, an at least temporary shut-down thus leads to a significant saving of energy, without a user perceiving any decline in the performance of the system as a whole.

The invention claimed is:

1. A working method for a mass storage system comprising:
   providing a virtual file system for at least one user of the mass storage system;
   determining an access probability for files stored logically in the virtual file system;
   storing files, in a distributed manner, whose access probability lies above a predetermined threshold value in a plurality of first physical mass storage devices which are independent of one another and have read/write units independent of one another;
   storing files, in a combined manner, whose access probability lies below the predetermined threshold value in at least one contiguous storage region of at least one second physical mass storage device; and
   switching the at least one second physical mass storage device into an operating state which has a reduced energy consumption compared with a normal operating state when the at least one second physical mass storage device has not been accessed for a first predetermined period of time; and
   switching the at least one second physical mass storage device into the normal operating state when an access request for at least one file stored on the at least one second physical mass storage device is registered via the virtual file system.

2. The working method according to claim 1, wherein the files stored logically in the virtual file system are stored redundantly on different mass storage devices.

3. The working method according to claim 1, in which, in determining the access probability, the files stored logically in the virtual file system are divided into at least two groups having different access probability ranges, wherein files assigned to a first group are stored in the plurality of first physical mass storage devices which are independent of one another, and files assigned to a second group are stored together in the at least one contiguous storage region of the at least one second physical mass storage device.

4. The working method according to claim 3, in which, in the step of storing files, in a distributed manner, the files assigned to the first group are divided into segments of a predetermined size, wherein segments of each file of the first group with more than one segment are stored on different ones of the plurality of first physical mass storage devices that are independent of one another.

5. The working method according to claim 3, in which, in the determining an access probability, the files stored logically in the virtual file system are divided into a plurality of groups having different access probability ranges, wherein each group whose access probability range lies above the predetermined threshold value is assigned a plurality of physical mass storage devices for distributed storage of the files associated with said group and each group whose access probability range lies below the predetermined threshold value is assigned at least one physical mass storage device for joint storage of the files associated with said group.

6. The working method according to claim 1, wherein the access probability for a file is determined on a basis of at least one of the following parameters: time of creation of the file, time of the last write-access to the file, time of the last read-access to the file and number of read and/or write accesses to the file within a second predetermined period of time.

7. The working method according to claim 1, wherein the mass storage system is operated in at least one RAID operating mode.

8. A computer program product comprising program instructions stored in a non-volatile memory device, wherein during execution of the program instructions by a processor of an electronic data processing system, the processor performs the method of claim 1.

9. A mass storage system comprising:
   a plurality of first physical mass storage devices that are independent of each other with read/write units that are independent of each other;
   at least one second physical mass storage device;
   at least one interface device that provides a virtual file system for at least one user of the mass storage system; and
   at least one control device that selectively stores files stored logically in the virtual file system on the first physical mass storage devices or on the at least one second physical mass storage device, wherein the control device determines an access probability for the files stored logically in the virtual file system, divides the files stored logically in the virtual file system into a plurality of groups having different access probability ranges, the plurality of groups comprising at least a first group and a second group, assigns at least one subgroup of the plurality of first physical mass storage devices to each group whose access probability range lies above a first predetermined threshold value, including the first group, to store files, in a distributed manner, whose access probability lies above the first predetermined threshold value distributed in the plurality of first physical mass storage devices, and assigns at least one second physical mass storage device to each group whose access probability range lies below the first predetermined threshold value, including the second group, to store files, in a combined manner, whose access probability lies below the first predetermined threshold value jointly in at least one contiguous storage region of the at least one second physical mass storage device.

10. The mass storage system according to claim 9, wherein the at least one second physical mass storage device comprises a drive unit and at least one rotatable storage medium which can be driven by the drive unit, wherein the control device or the at least one second physical mass storage device switches off the drive unit when the at least one second physical mass storage device has not been accessed for the first predetermined period of time.

11. The mass storage system according to claim 9, further comprising at least two second physical mass storage devices, wherein files stored on a first one of the at least two second physical mass storage devices are stored redundantly on at least a second one of the at least two second physical mass storage devices.

12. The mass storage system according to claim 9, wherein files or segments of files stored on a first one of the plurality of first physical mass storage devices are stored redundantly on at least a second one of the plurality of first physical mass storage devices.

13. The mass storage system according to claim 9, wherein the plurality of first physical mass storage devices connect via a first local connecting structure having a first bandwidth to the at least one interface device; and the at least one second physical mass storage device connects via a second connecting structure having a second bandwidth that is smaller than the first bandwidth to the at least one interface device.

14. The mass storage system according to claim 13, wherein the plurality of first physical mass storage devices connect to the at least one interface device via the first local connecting structure according to the Fiber Channel or RDMA Protocol; and the at least one second physical mass storage device connects to the at least one interface device via the second connecting structure according to the TCP/IP-based Protocol.

15. The mass storage system according to claim 9, wherein the plurality of first physical mass storage devices is managed by the control device via a common, distributed first file system and the at least one second physical mass storage device is managed via a second file system specific to the at least one second physical mass storage device.

16. The mass storage system according to claim 9, wherein the plurality of first physical mass storage devices comprises at least one first subgroup of mass storage devices with a first access speed and comprising mass storage devices having at least one semiconductor mass storage medium, and a second subgroup of mass storage devices with a second access speed that is lower than the first access speed and comprising mass storage devices having at least one rotatable mass storage medium; and the control device stores files whose access probability lies above a second predetermined threshold value greater than the first predetermined threshold value distributed in a plurality of mass storage devices of the first subgroup, and stores files whose access probability lies below the second predetermined threshold value and above the first predetermined threshold value distributed in a plurality of mass storage devices of the second subgroup.

17. The mass storage system according to claim 9, wherein the mass storage system is a RAID system.

18. A working method for a mass storage system comprising:
providing a virtual file system for at least one user of the mass storage system;
determining an access probability for files stored logically in the virtual file system, wherein the files stored logically in the virtual file system are divided into a plurality of groups having different access probability ranges, the plurality of groups comprising at least a first group and a second group;
storing files, in a distributed manner, whose access probability lies above a predetermined threshold value in a plurality of first physical mass storage devices which are independent of one another and have read/write units independent of one another, wherein at least a subgroup of the plurality of first physical mass storage devices is assigned to each group whose access probability range lies above the predetermined threshold value, including the first group, for distributed storage of the files associated with said group; and
storing files, in a combined manner, whose access probability lies below the predetermined threshold value in at least one contiguous storage region of at least one second physical mass storage device, wherein at least one physical mass storage device is assigned to each group whose access probability range lies below the predetermined threshold value, including the second group, for joint storage of the files associated with said group.

19. The working method according to claim 18, wherein, in the step of storing files, in a distributed manner, files assigned to the first group are divided into segments of a predetermined size, wherein segments of each file with more than one segment are stored on different ones of the plurality of first physical mass storage devices that are independent of one another.

20. A computer program product comprising program instructions stored in a non-volatile memory device, wherein during execution of the program instructions on a processor of an electronic data processing system, the processor performs the method of claim 18.

* * * * *